United States Patent [19]
Yoshihara et al.

[11] Patent Number: 5,976,236
[45] Date of Patent: *Nov. 2, 1999

[54] COATING COMPOSITION AND USE THEREOF

[75] Inventors: Toshio Yoshihara; Nobuko Takahashi; Satoshi Mitamura, all of Tokyo-To, Japan

[73] Assignee: Dai Nippon Printing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/621,581

[22] Filed: Mar. 26, 1996

[30] Foreign Application Priority Data

| Mar. 31, 1995 | [JP] | Japan | 7-100674 |
| Sep. 28, 1995 | [JP] | Japan | 7-273722 |

[51] Int. Cl.$^6$ .............. C09D 1/00; C09C 1/02; B01J 13/00
[52] U.S. Cl. ............... 106/286.6; 106/287.2; 106/287.26; 106/461; 313/484; 427/64; 427/372.2; 428/702; 501/12; 516/33
[58] Field of Search .......... 252/313.1; 106/287.2, 106/287.26, 461, 286.6; 501/12; 516/33, 88

[56] References Cited

U.S. PATENT DOCUMENTS

| 2,455,367 | 12/1948 | King | 252/309 X |
| 2,692,239 | 10/1954 | Hunter et al. | 252/313.1 |
| 3,097,957 | 7/1963 | Slotterbeck et al. | 106/287.26 X |
| 3,847,583 | 11/1974 | Dislich et al. | 501/12 X |
| 4,397,666 | 8/1983 | Mishima et al. | 501/12 X |
| 4,668,299 | 5/1987 | Nanao et al. | 106/286.6 X |
| 4,908,065 | 3/1990 | Tanitsu et al. | 106/287.2 X |
| 4,943,542 | 7/1990 | Hayashi et al. | 501/12 |
| 4,970,097 | 11/1990 | Kalinowski | 427/376.2 |
| 5,019,293 | 5/1991 | Burlitch | 252/313.1 |
| 5,132,253 | 7/1992 | Dawes | 501/12 |
| 5,384,294 | 1/1995 | Teowee et al. | 501/12 X |
| 5,509,958 | 4/1996 | Van de Leest | 106/287.26 |

FOREIGN PATENT DOCUMENTS

| 42 27 720 | 4/1993 | Germany . |
| 89/02869 | 4/1989 | WIPO . |
| 90/13851 | 11/1990 | WIPO . |
| 95/23119 | 8/1995 | WIPO . |

OTHER PUBLICATIONS

Patent Abstracts of Japan, vol. 013, No. 339 (C–624), Jul. 31, 1989, & JP-A-01 116082 (Catalysts & Chem Ind Co Ltd), May 9, 1989 (Abstract only).

Patent Abstracts of Japan, vol. 017, No. 225 (C–1055), May 10, 1993 & JP-A-04 362014 (Mitsubishi Materials Corp), Dec. 15, 1992 (Abstract only).

*Primary Examiner*—Richard D. Lovering
*Attorney, Agent, or Firm*—Parkhurst & Wendel, L.L.P.

[57] ABSTRACT

There are provided a coating composition that can satisfactorily form a film even at a low temperature by chemical means in a simple and stable manner, has excellent film strength, adhesion, protective effect and other properties in the form of a functional film and can form a functional film at a low cost, a process for producing the coating composition, a functional film, and a process for producing the functional films.

A hydrolyzable reaction site is partially hydrolyzed to prepare a sol of a partial hydrolyzate which is then coated on a substrate. The coating is then baked to prepare a corresponding metal oxide film, thereby forming a thin protective layer. Since no hydrolyzate is precipitated in the sol of the partial hydrolyzate, excellent film strength, adhesion, protective effect and other properties are offered. The metallic compound having a hydrolyzable reaction site is selected from an organometal compound, such as a metal alkoxide, an organometal complex, and an organometal acid salt, and an inorganic metal compound, such as an inorganic metal salt. The functional film of the present invention can be utilized in a protective layer formed of, for example, magnesium oxide in a plasma display.

4 Claims, 3 Drawing Sheets

5,976,236

COATING COMPOSITION AND USE THEREOF

TECHNICAL FIELD

The present invention relates to a coating composition capable of being coated on a substrate to form a functional film, which exhibits excellent adhesion to a substrate, denseness, and protective properties in optical articles, electronic and electric articles, articles made of magnetic materials and the like, and use of the coating composition.

BACKGROUND OF THE INVENTION

Layers having various functions have hitherto been formed in optical articles, electronic and electric articles, and articles made of magnetic materials. Further, various protective films are optionally provided for protecting these layers. High film strength and high adhesion to the layers having various functions are generally required of the protective film.

For example, the so-called "plasma displays" which utilize a luminescent phenomenon accompanying discharge is classified, according to the structure of an electrode (composed mainly of ITO) used, roughly into a direct current type plasma display wherein a metallic electrode is exposed on a discharge space and an alternating current type plasma display wherein a metallic electrode is covered with a dielectric layer. In the case of application of the plasma display to color televisions which are thin and have a large image plane, the alternating current type plasma display which has a memory function and can cope with an increase in size is suitable, and, in this case, a protective layer (a film composed mainly of magnesium oxide) is formed on the surface of the dielectric layer.

On the other hand, an antireflection layer (formed of, e.g., silicon dioxide or titanium dioxide) is formed on the surface of displays used in computers, image display equipment and the like from the viewpoint of preventing the reflection of external light to improve the visibility of the image on the display.

The so-called "functional films" are mainly formed of a metal oxide. Specifically, magnesium oxide or the like is used in a protective layer or the like for electrode members composed of ITO, tin oxide is used for various electronic and electric articles, iron oxide is used for articles made of magnetic materials, and silicon dioxide, titanium dioxide and the like are used for optical members. When these functional films are thin, they have hitherto been formed by EB vapor deposition, sputtering, CVD or the like, while when they are thick, a method has been used which comprises spray-coating a precursor of a metal oxide on a substrate to form a thick coating and baking the coating to convert the precursor to a metallic oxide (see, for example, Japanese Patent Publication Nos. 42579/1985, 59221/1988, and 13983/1982). Further, regarding the coating method, there is a method wherein a fine powder of a metal oxide is dispersed in a liquid binder which is converted to an oxide upon baking to form a functional film (Japanese Patent Laid-Open No. 283020/1994).

In the above coating methods, for example, regarding a MgO paste for use in the formation of a MgO film, by printing, as a protective layer for an alternating current type plasma display panel, it is known that the protective layer is poor in sputtering resistance unless uniform fine particles of MgO having a diameter of 0.03 to 0.3 μm are contained and the fine particles of MgO are homogeneously dispersed in a binder.

Among the above methods, EB vapor deposition and methods using a vacuum process, such as sputtering and CVD, have low productivity and, hence, lead to a high cost. In addition, it is very difficult to house a large deposited product, such as a plasma display, in a vacuum chamber. Therefore, when the size of an image plane should be increased, the above methods are disadvantageous in cost of equipment and productivity.

The coating method has been extensively and intensively studied in the art because it is simple. The studies, however, provided no satisfactory results. The reason for this is as follows. For pastes with functional particles incorporated therein, which have been commercially available, the functional particles agglomerate, making it difficult for the functional particles to exist in a homogeneously dispersed state in the paste. This in turn makes it difficult to form a highly uniform protective layer, posing problems including that the conventional heat treatment process offers no satisfactory film strength, adhesion and other properties and cracking occurs in the film during heat decomposition. Therefore, the use of the above paste with functional particles incorporated therein in the coating on the surface of a display imparts no necessary properties to the resultant panel.

In addition, the diameter of magnesium oxide particles incorporated into the paste is large, and, the viscosity of the paste per se is also large, making it difficult to reduce the thickness of the protective layer. Therefore, even though the discharge initiation voltage and the driving voltage are minimized, problems of large thickness and poor transparency remain unsolved.

In order to solve the above problems, the present inventors have already proposed the use of a sol-gel process wherein a metallic compound having a hydrolyzable reaction site is hydrolyzed to prepare a metal hydroxide sol, the sol is coated on a substrate, and the coating is baked to form a film of a corresponding metal oxide film as a protective layer, thus enabling the thickness of the protective layer to be reduced (Japanese Patent Application No. 271827/1994).

In this process, however, some metal hydroxides formed upon hydrolysis are likely to precipitate. In particular, for example, in the case of a magnesium compound, magnesium hydroxide formed by hydrolysis instantaneously precipitates as particles and settles. When a coating composition with the magnesium hydroxide particles precipitated therein is coated on a substrate to form a coating which is then gelled by the conventional baking process (a baking process wherein no high temperature is used) to form a functional film, the film is formed on the substrate with the magnesium oxide particles stacked on top of one another. Therefore, the density of the film is so low that, in some cases, no satisfactory film strength can be provided. Further, the formation of a thin film using such a coating composition cannot provide a dense film, resulting in no satisfactory function as a protective layer.

For example, magnesium dimethoxide, $Mg(OCH_3)_2$, frequently used as an alkoxide of magnesium in the sol-gel reaction is a powdery substance wherein methoxy groups have associated with one another. This substance, when used alone, is very difficult to be dissolved or dispersed in an organic solvent, making it difficult to prepare a stable sol solution.

On the other hand, a method wherein a solution of an organomagnesium in an organic solvent is coated on a substrate to form a coating which is then heat-decomposed to form a colorless, transparent magnesium oxide film is known from Japanese Patent Laid-Open No. 123657/1980. In this method for forming a magnesium oxide film, however, after the coating of the solution containing an organomagnesium on a substrate, hydrolysis proceeds from around the surface of the coating, resulting in successive precipitation of magnesium hydroxide particles. Therefore, the resultant magnesium oxide film has poor adhesion to the substrate.

Further, in the method, for forming a magnesium oxide film, described in Japanese Patent Laid-Open No. 123657/1980, the hydrolysis occurs mainly after coating of the solution containing an organomagnesium on a substrate. Therefore, there is a high possibility that organic materials produced as by-products in the hydrolysis, that is, impurities, are present within the magnesium hydroxide particles. In the course of the production of a magnesium oxide film, it is difficult to remove the impurities by scattering from the coating.

Further, due to the nature of the method, for forming a magnesium oxide film, described in Japanese Patent Laid-Open No. 123657/1980 wherein the hydrolysis occurs mainly after coating of the solution containing an organomagnesium on a substrate, it is difficult to control the particle diameter of precipitated magnesium hydroxide as desired. Consequently, the formed magnesium oxide film is likely to be opaque and, hence, unsatisfactory in transparency.

DISCLOSURE OF THE INVENTION

In view of the above situation, the present invention has been made, and an object of the present invention is to eliminate the above drawbacks of the prior art and to provide a coating composition that can satisfactorily form a film even at a low temperature by chemical means in a simple and stable manner, has excellent film strength, adhesion, protective effect and other properties and excellent transparency in the form of a functional film and can form a functional film at a low cost, a process for producing the coating composition, a functional film, and a process for producing the functional film.

In connection with the above object, another object of the present invention is to provide a coating composition, comprising a stable alkoxide solution, which can satisfactorily form a film, even at a low temperature by the sol-gel process, having the above excellent properties, a process for producing the coating composition, a functional film, and a process for producing the functional film.

A further object of the present invention is to provide an alternating current type plasma display wherein the above functional film is used as a protective film for the dielectric layer of an alternating current type plasma display, thereby lowering the discharge initiation voltage and the driving voltage (power consumption) and, at the same time, enabling the production of the alternating current type plasma display at a low cost, and a process for producing the same.

In order to attain the above objects, the composition of the present invention basically comprises a partial hydrolyzate derived from a metallic compound having a hydrolyzable reaction site.

According to the present invention, the partial hydrolyzate of the metallic compound is preferably one prepared by hydrolyzing a metallic compound having a hydrolyzable reaction site in the presence of water in not more than stoichiometric amount relative to the hydrolyzable reaction site.

The partial hydrolyzate is a sol solution prepared from the following materials (1) to (4): (1) a metallic compound having a hydrolyzable reaction site, (2) an additive that can function to dissolve or disperse the metallic compound in a solvent and to permit the hydrolysis of the metallic compound to proceed in a rate-controlling manner, (3) water in not more than a stoichiometric amount relative to the hydrolyzable reaction site, and (4) an organic solvent.

Among the above materials, water is spontaneously supplied from moisture in the air. Therefore, the present invention can be carried out without the provision of water. Specifically, the coating composition of the present invention may be a sol solution prepared from the following materials (1) to (3): (1) a metallic compound having a hydrolyzable reaction site, (2) an additive that can function to dissolve or disperse the metallic compound in an organic solvent and to permit the hydrolysis of the metallic compound to proceed in a rate-controlling manner, and (3) an organic solvent.

The process for producing a coating composition according to the present invention comprises the steps of: (1) adding a metallic compound having a hydrolyzable reaction site and an additive that can function to dissolve or disperse the metallic compound in an organic solvent and to permit the hydrolysis of the metallic compound to proceed in a rate-controlling manner, to an organic solvent to dissolve or disperse the metallic compound therein; (2) adding water in not more than stoichiometric amount relative to the hydrolyzable reaction site to the resultant solution or dispersion to partially hydrolyze the metallic compound; and (3) maturing the partial hydrolyzate solution to grow particles of a metal oxide and/or a metal hydroxide, thereby preparing a stable sol solution.

The process for producing a MgO film as a functional film, wherein an alkaline earth metal alkoxide, preferably a magnesium alkoxide, is used as a preferred example of the metallic compound having a hydrolyzable reaction site, according to the present invention comprises the steps of: (1) adding at least one compound, selected from a carboxylic acid, a carboxylic acid derivative, an alkanolamine compound, a glycol compound, a glycol derivative, and an organic compound having a carbon-carbon triple bond, and a magnesium alkoxide, to an organic solvent to dissolve or disperse the magnesium alkoxide therein; (2) adding water in not more than a stoichiometric amount relative to the alkoxyl group of the magnesium. alkoxide to the resultant solution or dispersion to partially hydrolyze the magnesium alkoxide; (3) maturing the partial hydrolyzate solution to grow magnesium hydroxide particles to prepare a stable sol solution; and (4) using the sol solution as a coating composition.

The functional film according to the present invention is prepared by coating the above coating composition on a substrate under heating or without heating.

BEST MODE FOR CARRYING OUT THE INVENTION

Figure 1:
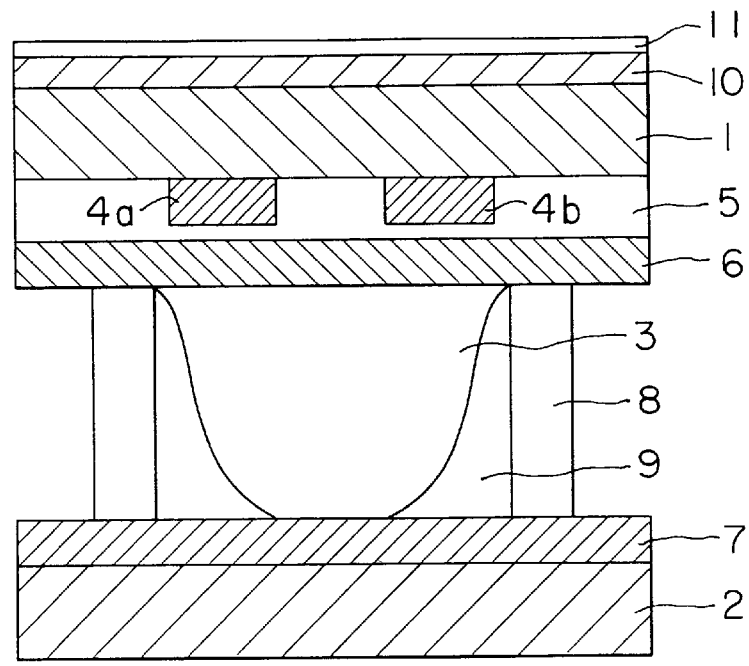
FIG. 1 is a schematic cross-sectional view of an alternating current type plasma display of a surface discharge system, wherein the coating composition of the present invention has been applied to a display panel for a color television.

The "metallic compound having a hydrolyzable reaction site" as a starting material for the coating composition of the present invention includes, for example, organometallic compounds, such as metal alkoxides, organometal complexes, and organometallic acid salts, and inorganic metallic compounds, such as inorganic metal salts including nitrates, oxynitrates, and chlorides, all of the above compounds having a hydrolyzable reaction site.

In an inorganic component growth process (belonging to the so-called "sol-gel process") wherein particularly a metal alkoxide or an inorganic metal salt is hydrolyzed as a starting material for a coating composition followed by polycondensation to form a network of gel having a metal-oxygen-metal bond, the reaction is carried out at around room temperature in a solution form. Therefore, this process is preferably utilized for realizing the present invention from the viewpoint of the protection of the substrate to be coated and the advantage in the treatment.

The coating composition used in the present invention basically comprises a partial hydrolyzate derived from a metallic compound having a hydrolyzable reaction site, preferably an alkaline earth metal compound. By virtue of this constitution, the coating composition causes no precipitation of hydrolyzate and is in a transparent liquid form. For this purpose, it is particularly important that the hydrolysis of the metallic compound be carried out in the presence of water in an amount of not more than a stoichiometric amount relative to the hydrolyzable reaction site of the metallic compound (for example, 2 or less in the case of a magnesium compound) to give a hydrolyzate with part of the reaction site remaining unhydrolyzed, that is, a partial hydrolyzate. Since water is consumed in the partial hydrolysis, the resultant hydrolyzate is free from water. Therefore, the coating composition is substantially free from water.

In the present invention, the partial hydrolysis of the metallic compound to give a partial hydrolyzate can satisfactorily proceed at room temperature. If necessary, the temperature may be raised to about 80° C. in order to increase the reaction rate.

Further, the partial hydrolysis can be carried out in the presence of a hydrolysis catalyst, such as hydrochloric acid or ammonia, to increase the reaction rate.

In the coating composition of the present invention, the metal contained in the partial hydrolyzate prepared by partially hydrolyzing a metallic compound having a hydrolyzable reaction site is not particularly limited for attaining high adhesion to a substrate and high coating strength, and examples thereof include Si, Ti, Zr, Sb, and Sn. Alkoxides of these metals are preferred because they are relatively inexpensive and easily available and a reaction thereof can be easily regulated.

Further, in the case of such metallic compounds as will cause precipitation of hydrolyzates upon complete hydrolysis, specifically organometallic compounds and inorganic metallic compounds containing metals such as Mg, Be, Cu, Ag, Pb, Zn, Ca, Li, K, and Na, partial hydrolysis thereof without complete hydrolysis of these metallic compounds can prevent the precipitation of hydrolyzates. Therefore, the preparation of coating compositions comprising such partial hydrolyzates are advantageous particularly from the viewpoint of realizing high adhesion of functional films formed of these metal oxides to a substrate and high film strength.

In the coating composition of the present invention, when the metallic compound is an alkaline earth metal compound, the additive may be at least one compound, selected from a carboxylic acid, a carboxylic acid derivative, an alkanolamine compound, a glycol compound, a glycol derivative, and an organic compound having a carbon-carbon triple bond. These compounds accelerate the dissolution or dispersion of a sparingly soluble metallic compound to enable the metallic compound to come into homogeneous contact with water resulting in hydrolysis in very rate-controlling manner. By virtue of this rate control, particles in the resultant solution are very homogeneous. It is believed that in the solution, the metallic compound combines with the additive to form a compound represented by the following formula (1) or (2):

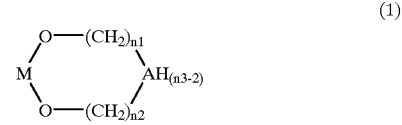

(1)

wherein M represents an alkaline earth metal atom, A represents a hetero atom, n1 and n2 are each an integer of 1 or more, and n3 is a valence of the hetero atom; or

(2)

wherein M represents an alkaline earth metal atom and n is an integer of 1 or more.

In the above formula, the "hetero atom" refers to an atom other than carbon constituting the ring of the heterocyclic compound, for example, a nitrogen atom, a sulfur atom, a phosphorus atom, or a fluorine atom.

The present invention will now be described according to an embodiment wherein an alkaline earth metal compound, for example, magnesium dimethoxide [Mg(OCH$_3$)$_2$] is used as the metallic compound having a hydrolyzable reaction site and diethanolamine is used as the additive. It is needless to say that the present invention covers, besides the combination of the metallic compound with the additive, all other feasible combinations described in the claims of the present specification.

For example, magnesium methoxide, when used alone without the above additives, is very difficult to be dissolved or dispersed in an organic solvent. On the other hand, diethanolamine [HN(C$_2$H$_4$OH)$_2$] exhibits very strong polarization in N and O atoms in its molecule, enabling the formation of a very stable solution in an organic solvent, such as methanol, by virtue of the coordinating effect of the diethanolamine. For this reason, diethanolamine is used as an additive for dissolving or dispersing particularly magnesium dimethoxide. In this case, a material, dissolved in the solution, obtained by this reaction is believed to have a chelate structure, represented by the following formula (3), wherein Mg in the magnesium dimethoxide is coordinated with N in the diethanolamine.

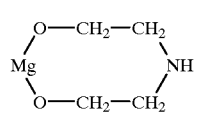
(3)

The above additives, such as diethanolamine, have functions including that: the above metallic compound, such as a metallic alkoxide, can be dissolved or dispersed in an organic solvent; the hydrolysis in the presence of water can be allowed to proceed in a very rate-controlling manner rather than in an instantaneous manner; and the particle diameter of the sol can be made uniform and very small, i.e., brought to 10 to 100 nm, enabling the preparation of a very stable sol solution comprising a partial hydrolyzate of a metallic compound. In the above case, if magnesium dimethoxide is hydrolyzed without use of diethanolamine, large precipitates of magnesium hydroxide instantaneously would occur, making it impossible to prepare a stable sol solution.

Additives, other than the diethanolamine, which, together with the magnesium alkoxide, can form a chelate structure as described above include ethylene glycol and ethylene glycol derivatives, such as diethylene glycol and methyl CELLOSOLVE®. In particular, in the case of diethylene glycol, the oxygen atom in its molecule is considered to coordinate with Mg in the magnesium dimethoxide, offering a more stable dispersion. Further examples of other compounds capable of forming such a chelate structure as described above include organic compounds having a carbon-carbon triple bond, such as acetylene and glycols.

In the production of the coating composition of the present invention, the hydrolysis is preferably carried out in a water-containing solvent so that the reaction for forming a partial hydrolyzate can proceed homogeneously and efficiently. In this case, the solvent used is not particularly limited, and examples thereof include alcohols, esters, ketones, and organic solvents having a high dielectric constant, such as propylene carbonate and γ-butyrolactone.

The partial hydrolyzate thus produced is very stably maintained unless water in an amount exceeding the stoichiometric amount is included in the liquid. Although the form of the partial hydrolyzate in the liquid varies depending upon the starting material and the amount of water, the partial hydrolyzate is generally dissolved or dispersed as a polymer having a low degree of polymerization or ultrafine particles having a diameter of not more than 0.3 μm in the solvent. Thus, the coating composition of the present invention is such that the partial hydrolyzate of a metallic compound having a hydrolyzable reaction site is in a state of dissolution or dispersion in a solvent substantially free from water.

The concentration of the partial hydrolyzate in the solvent is not particularly limited. However, when the stability of the hydrolyzate in the solvent is taken into consideration, the concentration is preferably in the range of from 0.1 to 30% by weight because the coating composition can be stably stored for a long period of time.

In the case of particularly a magnesium compound having a hydrolyzable reaction site, complete hydrolysis thereof gives $Mg(OH)_2$ which is disadvantageously gelled and precipitated in an instantaneous manner and, at the same time, in itself poor in adhesion to a contemplated substrate to be coated, particularly a glass substrate, making it impossible to form a high-strength coating. By contrast, when the amount of water used for the hydrolysis is not more than the stoichiometric amount, the hydrolysis of the magnesium compound is not complete and the solution is kept in a stable sol form comprising a partial hydrolyzate. In this case, since $Mg(OH)_2$ in a complete form is not produced, the coating composition has high adhesion to the substrate. The reaction for the formation of a hydrolyzate satisfactorily proceeds at room temperature. If necessary, however, the temperature raised to about 80° C. to accelerate the reaction.

Further, the partial hydrolysis may be carried out in the presence of a hydrolysis catalyst, such as hydrochloric acid or ammonia, to accelerate the reaction.

The surface area of magnesium oxide in the protective layer should be increased, for example, from the viewpoint of increasing the secondary electron emission rate in an alternating plasma display. For this reason, the particle diameter of magnesium oxide is preferably not more than 0.3 μm, more preferably not more than 0.1 μm. When the particle diameter is brought to not more than 0.3 μm to eliminate gaps among particles, thereby increasing the surface area, a magnesium oxide film can be efficiently formed by the conventional heat treatment process. Although the thickness of the magnesium oxide film is not particularly limited, it is preferably not more than 10 μm, particularly preferably not more than 1 μm.

The composition comprising a partial hydrolyzate according to the present invention is coated on a substrate, and the coating is then dried. In the step of drying, the solvent in the coating is removed by evaporation, and the coating absorbs moisture in the air, causing the hydrolysis to further proceed. Finally, the partial hydrolyzate is completely hydrolyzed, and the coating is finally formed of a metal hydroxide. For example, for a partial hydrolyzate of a magnesium compound, after coating, the hydrolysis further proceeds and is completed to form a dense coating of $Mg(OH)_2$ in a complete form which can be heat-treated to be brought to a high-crystalline, high-density MgO film. The use of a complete hydrolyzate as the raw material for coating cannot offer such a high-crystalline, high-density MgO film.

Depending upon contemplated applications, the final functional film prepared according to the present invention is not necessarily required to be heat-treated and, further, is not necessarily formed of a high-crystalline, complete metal oxide. For example, when it is used as an antireflection film or the like, a film formed of sol particles obtained by a wet film containing a partial hydrolyzate has satisfactory functions for this purpose. In the preparation of such a functional film, heat treatment of the coating is not particularly necessary.

According to the present invention, a functional film having good adhesion to a substrate can be easily prepared by simply coating the coating composition of the present invention at room temperature. This film is not necessarily required to be subjected to the step of heating and baking. However, the heating, baking and other treatments of the film according to need result in more complete conversion of the film to an oxide film, increased crystallinity, increased film strength, and increased adhesion to a substrate. In this case, the heating and baking temperature are preferably in the range of from 300 to 500° C. The coating composition of the present invention can be coated on a substrate by various coating methods, such as spin coating, dip coating, spray coating, roll coating, meniscus coating, bar coating, curtain flow coating, and casting.

According to the above process for producing a functional film, the formation of a thin film, having a thickness of not more than 1 μm, formed of magnesium oxide alone without use of any binder, which has been difficult to be attained by using the conventional coating paste, can be realized by coating the coating composition of the present invention. The thickness of the functional film produced by the above process for producing a functional film is not particularly limited. However, it is preferably not more than 10 μm, particularly preferably not more than 1 μm, from the viewpoint of transparency.

The molar ratio of the metal alkoxide, such as magnesium dimethoxide, to at least one compound as an additive selected from a carboxylic acid, a carboxylic acid derivative, an alkanolamine compound, a glycol compound, a glycol derivative, and an organic compound having a carbon-carbon triple bond is preferably 1:1 from the viewpoint of improving the workability. In the above embodiment, when the amount of the diethanolamine is less than the equimolar amount, some of the magnesium dimethoxide remains undissolved, providing no uniform MgO film. On the other hand, when the amount of diethanolamine exceeds the equimolar amount, excess diethanolamine remaining unreacted stays within the film, necessitating removing the diethanolamine by heating at 180 to 200° C. or above. In forming the MgO film at the lowest possible temperature in a short time, this heating has an unnecessary thermal influence on the substrate and is disadvantageous also from the viewpoint of working efficiency.

When an alkanol compound, such as diethanolamine, is used in combination with a glycol compound, a glycol derivative or an organic compound having a carbon-carbon triple bond, the coating may be heat-treated at a temperature below that in the case of heat treatment where the alkanolamine alone is used. Therefore, when the application of a high temperature is difficult due to the nature of the substrate, a divalent organic compound having oxygen or an organic compound having a carbon-carbon triple bond may be used either in combination with the alkanolamine or alone.

A known thickener, such as ethyl cellulose or hydroxypropyl cellulose, may be further added to the coating composition of the present invention in order to improve the printing or other properties.

A preferred embodiment for the preparation of a sol solution of the coating composition according to the present invention, wherein an alkaline earth metal compound, preferably a magnesium dimethoxide, is used as a metallic compound, diethanolamine is used as an additive for dissolving or dispersing the metallic compound, and ethanol is used as the solvent will be described. One mol of magnesium dimethoxide and one mol of diethanolamine are added to ethanol, and the mixture is stirred at room temperature (20° C.) for about 8 hr to prepare a transparent, homogeneous solution. One mol of pure water dissolved in ethanol is added to the solution, and the mixture is stirred at room temperature (20° C.) for about 5 hr to carry out hydrolysis, thereby preparing a partial hydrolyzate. The partial hydrolyzate is stirred at room temperature (20° C.) for 2 to 3 days to mature the partial hydrolyzate while growing crystal grains, thereby preparing a homogeneous sol solution.

An example of the functional film of the present invention is a functional film of magnesium oxide suitable for use, for example, as a protective layer provided on a dielectric layer of an alternating current type plasma display. However, the applications thereof is not limited to this, and the functional film of the present invention may be applied to other substrates depending upon the purposes.

In the conventional sol-gel process, for example, as described above in connection with the magnesium compound having a hydrolyzable reaction site, hydrolysis of the whole reaction site in metallic compounds containing metal as noted above results in the precipitation of particles of a hydrolyzate, such as a metal hydroxide, in a coating composition. When this coating composition is coated on a substrate that cannot be significantly heated, magnesium hydroxide particles are microscopically put on top of one another to form an aggregate which, in this state, is converted to magnesium oxide to form a functional film. This functional film is unsatisfactory in hardness and adhesion to a substrate.

By contrast, the functional film of the present invention comprises a metal oxide layer formed by coating a coating composition basically comprising a partial hydrolyzate derived from a metallic compound having a hydrolyzable reaction site. Therefore, any hydrolyzate, specifically any metal oxide, is not precipitated in the coating composition, and in the coating composition, sol particles of a partial hydrolyzate of a metallic compound are very finely dissolved or dispersed in a solvent substantially free from water to form a transparent liquid on the whole. The coating composition of the present invention may be coated on a substrate to form a functional film that exhibits excellent adhesion, denseness, and protective property in optical articles, electronic and electric articles, articles made of magnetic materials and the like.

In addition, the coating composition of the present invention comprises a partial hydrolyzate, i.e., an intermediate, of a contemplated metal oxide, obtained by hydrolysis, which partial hydrolyzate is in a very small particle form and highly reactive. The coating composition of the present invention is coated to form a coating which is, if necessary, baked to form a functional film. The functional film thus formed is not such that metal oxide particles having a suitable size are merely stacked on top of one another. That is, in the formed functional film, the metal oxide is flatly and homogeneously distributed integrally with the surface of a substrate, offering enhanced adhesion and high strength. This results in further reduced thickness of the functional film of the present invention. When the concentration of the partial hydrolyzate in the coating composition of the present invention is less than 0.1% by weight, no satisfactory properties are attained. On the other hand, when it is more than 30% by weight, the film thickness becomes so large that cracking and other unfavorable phenomena occur. For this reason, it is preferably in the range of from 0.1 to 30% by weight.

Further, in the process for producing a functional film according to the present invention, a coating composition comprising a hydrolyzate of a metallic compound is coated on the surface of a substrate to form a functional film. This process enables a film to be formed on a large area in a simple manner at a low cost. Therefore, the process of the present invention is very advantageous for producing several components of a color television display having a large area (for example, about 40 in. in terms of diagonal length).

The present invention will now be described with reference to a preferred embodiment wherein the coating composition of the present invention has been applied to a display panel of a color television.

FIG. 1 is a schematic view of the structure of an alternating current type plasma display of a surface discharge system wherein the coating composition of the present invention has been applied to a display panel of a color television. In FIG. 1, numerals 1 and 2 respectively designate a front substrate and a back substrate provided so as to be parallel to and face each other with a gas discharge space 3 sandwiched between the two substrates. The front substrate 1 and the back substrate 2 are each formed of a glass having a predetermined thickness.

A pair of electrodes, an electrode X 4a and an electrode Y 4b, are provided on the front substrate 1 in its surface facing the back substrate 2. The pair of electrodes are covered with a dielectric layer 5 made of glass, and the dielectric layer 5 is covered with a protective layer 6 comprising a magnesium oxide layer formed using the coating composition of the present invention. On the other hand, an address electrode 7, a barrier 8, and a phosphor 9 are provided on the back substrate 2 in its surface facing the front substrate 1. Further, a titanium dioxide film (a high refractive index layer) 10 and a silicon dioxide film (a low refractive index layer) 11 each formed of the coating composition of the present invention are provided as an antireflection film on the front substrate 1.

Figure 2:
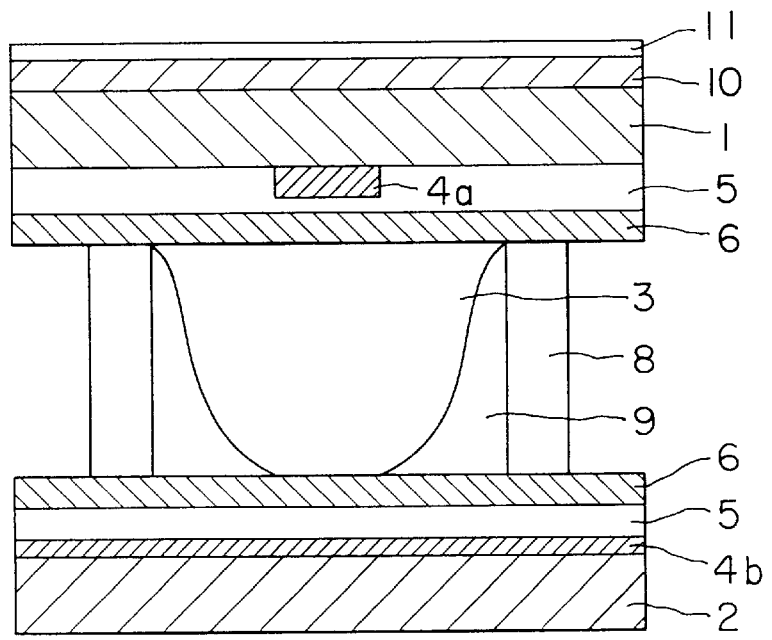
FIG. 2 is a schematic cross-sectional view of an alternating current type plasma display of an opposed discharge system, wherein the coating composition of the present invention has been applied to a display panel for a color television.

FIG. 2 shows a schematic view of the structure of an alternating current type plasma display of an opposed discharge system. An electrode X 4a is provided on a front substrate 1 in its surface facing a back surface 2. This electrode X 4a is covered with a dielectric layer 5, made of glass, which is covered with a protective layer 6 of a magnesium oxide film formed using the coating composition of the present invention. On the other hand, an electrode Y 4b, a dielectric layer 5, a protective layer 6, of the same type as described above, according to the present invention, a barrier 8, and a phosphor 9 are provided on the back substrate 2 in its surface facing the front substrate 1.

Further, a titanium dioxide film (a high refractive index layer) 10 and a silicon dioxide film (a low refractive index layer) 11 each formed using the coating composition of the present invention are provided as an antireflection film on the front substrate 1.

The protective layer 6 may be formed by dip-coating the coating composition of the present invention. The dip coating enables the protective layer 6 to be formed on a larger area than that formed by the thin film forming process. Therefore, for example, a color television display having a large area (for example, about 40 in. in terms of diagonal length) can be produced at a low cost.

In the protective layer 6 formed by coating a coating composition composed mainly of a magnesium compound having a hydrolyzable reaction site on a dielectric layer 5 and baking the coating, magnesium oxide sol particles are grown and stacked on the surface of the dielectric layer 5 so as to be parallel, in its plane direction, to the dielectric layer 5, enabling the thickness of the protective layer 6 to be significantly reduced.

A thickness of not more than 2 $\mu$m is generally said to be the most necessary and sufficient condition from the practical viewpoint for the protective layer of the alternating current type plasma display. The thickness of not more than 2 $\mu$m can be sufficiently realized by the process for producing a functional film according to the present invention. When the protective layer 6 is as thick as, for example, about 10 $\mu$m, the effect of wall charges as a source of a memory function, an important property of the alternating current type plasma display, is deteriorated, necessitating increasing the drive voltage. Consequently, high pressure tight specifications should be applied to the voltage of a transistor used in the drive circuit. The present invention poses no such problem because the thickness of the protective layer can be reduced to not more than 2 $\mu$m.

The coating composition of the present invention causes no precipitation of any hydrolyzate and, hence, when coated, can form a uniform thin film. The thickness of the protective layer 6, of a magnesium oxide film, formed using such a coating composition can be controlled as desired and brought to not more than about 2 $\mu$m. Further, the film strength is so high that there is no fear of the dielectric layer 5 being exposed by cracking. Thus, a reduction in thickness of the protective layer 6 can lower the drive voltage, leading to realization of a reduced cost and enabling the thickness of the display per se to be made very small.

The above description on the alternating current type plasma display is only for illustrating an embodiment using a functional film prepared from the coating composition of the present invention, and application examples of the coating composition of the present invention and functional films prepared from the coating composition of the present invention are not limited to the alternating current type plasma displays shown in FIGS. 1 and 2.

EXAMPLE 1

(Preparation of coating composition)

A mixture of the following ingredients was stirred at room temperature for 8 hr to prepare an ethanol solution of magnesium dimethoxide.

| | |
|---|---|
| Ethanol | 117 parts by weight |
| Magnesium dimethoxide | 15 parts by weight |
| Diethanolamine | 18 parts by weight |

Twenty parts by weight of the ethanol solution was added to 70 parts by weight of ethanol containing 0.42 part by weight of water in a nitrogen atmosphere. The mixture was stirred at room temperature for 5 hr to prepare a colorless, transparent solution of a partial hydrolyzate of magnesium dimethoxide. Thus, a coating composition of Example 1 was prepared.

(Formation of protective layer formed of magnesium oxide film)

The coating composition prepared in the above step was coated in the air on the surface of a dielectric layer 5 shown in FIG. 1 by dip coating, a kind of printing by coating. The coating was dried and heat-treated (baked) by holding the coating at 500° C. for two hr. The resultant magnesium oxide film was a completely transparent film and had a high adhesion (pencil hardness: not less than 5H) to the dielectric layer 5.

Figure 3:
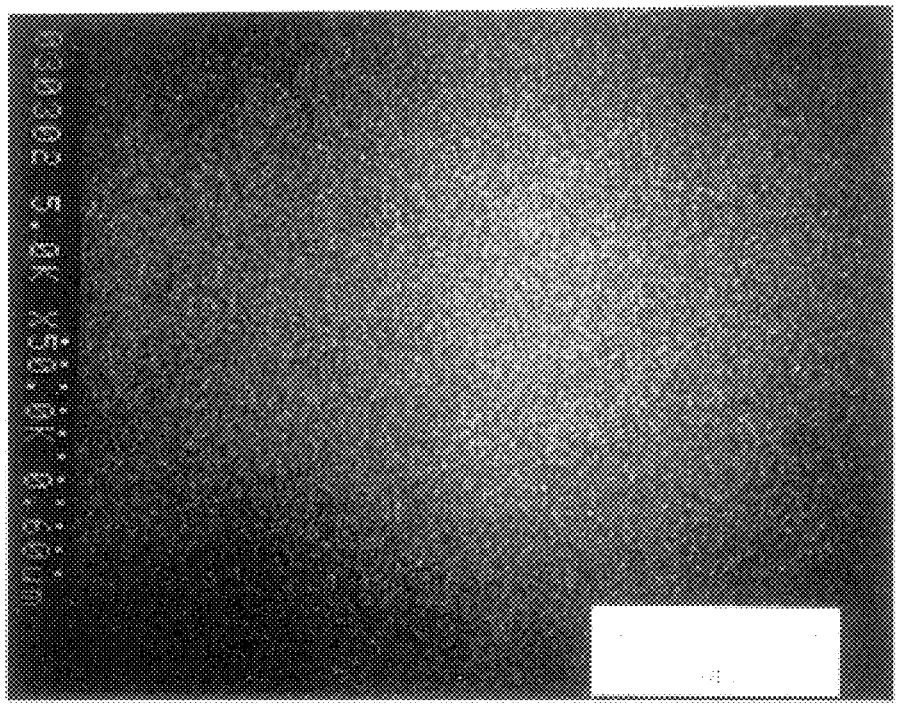
FIG. 3 is a photomicrograph (magnification: ×50.0 K) showing the particle structure of the surface of a protective layer of a magnesium oxide film in Example 1.

FIG. 3 is an electron photomicrograph (×50.0 K) showing the particle structure of the surface of a protective layer of a magnesium oxide film in Example 1. For comparison, an electron photomicrograph (×50.0 K) showing the particle structure of the surface of a protective layer formed by vacuum deposition of magnesium oxide on a dielectric layer 5 is shown in FIG. 4, and FIG. 5 is an electron photomicrograph (×50.0 K) showing a particle structure of the surface of a protective layer of a magnesium oxide film prepared from a coating composition comprising a complete hydrolyzate of magnesium dimethoxide prepared in Comparative Example 1 described below.

Figure 4:
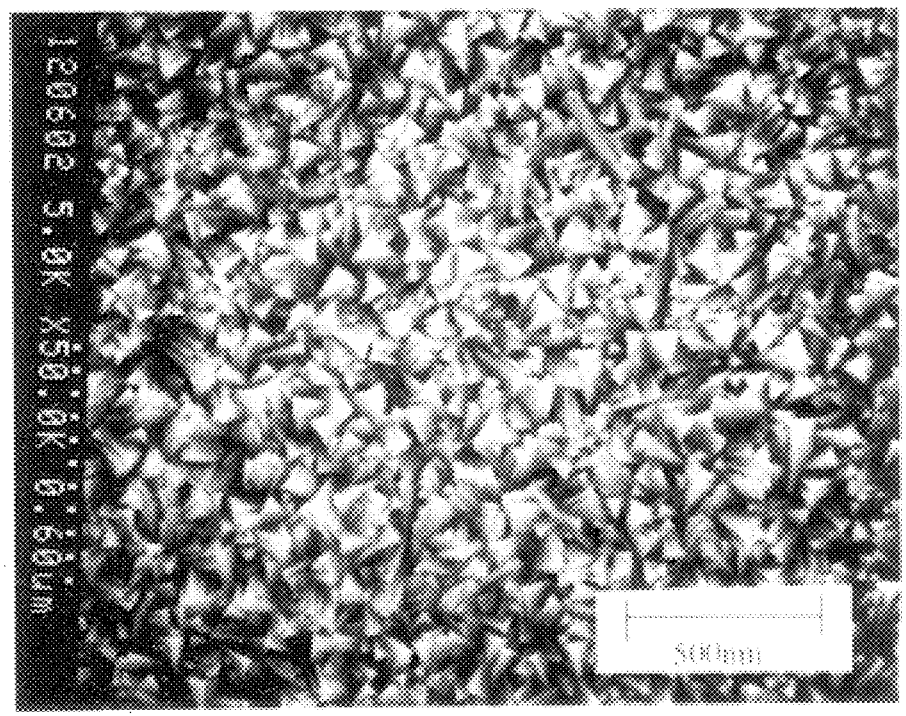
FIG. 4 is a photomicrograph (magnification: ×50.0 K) showing the particle structure of the surface of a protective layer formed by vacuum deposition of magnesium oxide on a dielectric layer 5.
Figure 5:
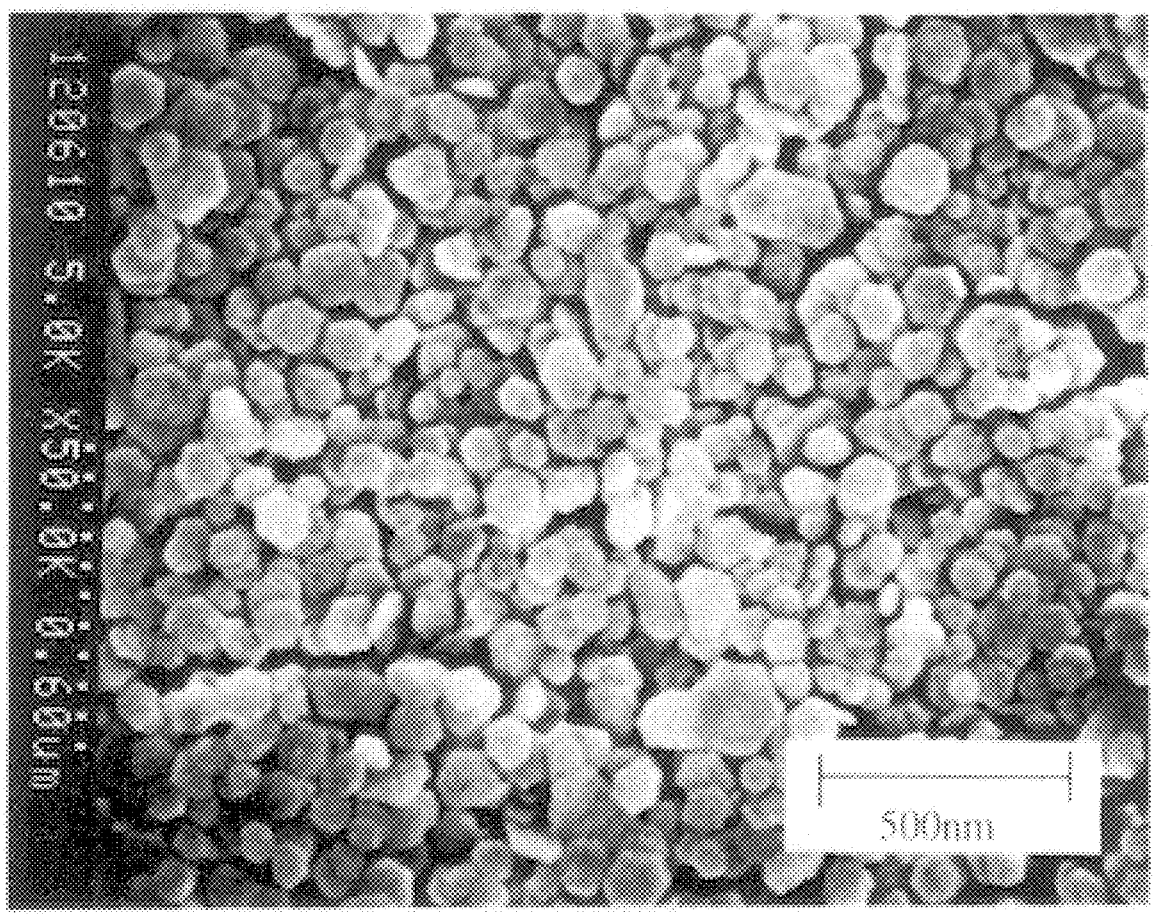
FIG. 5 is a photomicrograph (magnification: ×50.0 K) showing the particle structure of the surface of a protective layer prepared from a coating composition comprising a complete hydrolyzate of magnesium dimethoxide prepared in Comparative Example 1.

From FIGS. 3 to 5, it is apparent that, for the protective layer of a magnesium oxide film prepared using protective layer of a magnesium oxide film prepared using the coating composition of Example 1, particles present on the surface of the layer are uniform and fine and the layer is formed of a dense film.

(Preparation of panel)

An electrode X 4a, a chromium electrode, was formed by vacuum deposition on a front substrate 1 made of glass, and a dielectric layer 5 was formed by vacuum deposition. A protective layer 6 of a magnesium oxide film was formed on the dielectric layer 5 by a method described in Example 1 in connection with the formation of the magnesium oxide film. Subsequently, a barrier 8 was formed by screen printing on the surface of the protective layer 6 remote from the front substrate 1, and a fluorescent substance was coated on the barrier 8 to form a phosphor 9.

Separately, a Cr electrode formed by vacuum deposition on a back substrate 2 made of glass was patterned to form an electrode Y 4b, and a dielectric layer 5 was formed on an electrode Y 4b by vacuum deposition. Thereafter, a protective layer 6 of a magnesium oxide film was formed by a method described in Example 1 in connection with the formation of the magnesium oxide film. The thickness of the Cr electrode (electrode Y 4b) on the back substrate 2 was 2000 Å, and the thickness of the dielectric layer 5 was 8000 Å.

The two laminates thus obtained were laminated on top of the other so as for the protective layers to face each other, and He-Xe (1.1%) Penning gas was filled to 500 Torr into a space defined by the barrier 8 to prepare an opposed discharge alternating current type plasma display of Example 1.

For the opposed discharge alternating current type plasma display, a minimum ignition voltage Vi and a minimum sustaining voltage Vsm were measured on an alternating current pulse of a driving wave form having a driving frequency of 15 kHz and a duty ratio of 23%. As a result, the minimum ignition voltage Vi was 200 V, the minimum holding voltage Vsm was 145 V, and the memory margin (Vi-Vsm) was 55 V. This value was 40 to 50 V higher than that for a panel, having the same structure, using a vacuum deposition film as the magnesium oxide film. However, the memory margin was 55 V which was substantially the same as that for a panel, having the same structure, using a vacuum deposition film as the magnesium oxide film.

From these measurements, it is apparent that the protective layer 6 of a magnesium oxide film in the opposed discharge alternating current type plasma display prepared in Example 1 has satisfactory properties.

Comparative Example 1

Twenty parts by weight of the ethanol solution prepared in Example 1 was added to 70 parts by weight of ethanol containing 1.0 part by weight (an amount in excess over a hydrolyzable site of magnesium dimethoxide) of water in a nitrogen atmosphere, and the mixture was stirred at room temperature for 5 hr. This resulted in the formation of magnesium hydroxide particles, and the whole liquid became cloudy.

The resultant magnesium hydroxide particle dispersion was dip-coated in the air on a dielectric layer 5 in the same manner as in Example 1. In the course of drying at 120° C., magnesium hydroxide particles were precipitated, making it impossible to form a film.

EXAMPLE 2
(Preparation of silicon dioxide solution)

A mixture of the following ingredients was stirred at room temperature for 3 hr to prepare a solution of a partial hydrolyzate of tetraethoxysilane.

| Ethanol | 24 parts by weight |
| Tetraethoxysilane | 15 parts by weight |
| 0.1N aqueous hydrochloric acid solution | 3.9 parts by weight |

EXAMPLE 3
(Preparation of titanium dioxide solution)

A mixture of the following ingredients was stirred at room temperature for 3 hr to prepare a solution of a partial hydrolyzate of tetraethoxytitanium.

| Ethanol | 34 parts by weight |
| Tetraethoxytitanium | 15 parts by weight |
| 1N aqueous hydrochloric acid solution | 3.6 parts by weight |

Comparative Example 2

A mixture of the following ingredients was stirred at room temperature for 3 hr to prepare a solution of a complete hydrolyzate of tetraethoxytitanium.

| Ethanol | 34 parts by weight |
| Tetraethoxytitanium | 15 parts by weight |
| 1N aqueous hydrochloric acid solution | 4.8 parts by weight |

Three hours after the initiation of stirring, the whole liquid gelled, making it impossible to use the liquid for coating.

EXAMPLE 4
(Formation of antireflection film)

The partial hydrolyzate of tetraethoxytitanium prepared in Example 2 and the partial hydrolyzate of tetraethoxysilane prepared in Example 3 were coated in the air in that order on the surface of a front substrate 1 shown in FIG. 1 by dip coating, a kind of printing by coating. The coating was dried at 120° C. for one hr and heat-treated (baked) by keeping the coating at 300° C. for 2 hr, thereby forming a titanium dioxide film (a high refractive index layer) 10 and a silicon dioxide film (a low refractive index layer) 11 in that order on the surface of the front substrate 1.

The titanium dioxide film (high refractive index layer) 10 had a thickness of 0.7 µm, and the silicon dioxide film (low refractive index layer) 11 had a thickness of 0.1 µm. Each film was completely transparent and had a high adhesion (pencil hardness: not less than 5H) to the front substrate 1. The transmittance of normal incident light at 560 nm was measured for the antireflection film. As a result, it was found that a 10% increase in transmittance could be attained for the front substrate 1 alone.

According to the present invention, a functional film constituted by a metal oxide layer formed by coating a coating composition basically comprising a partial hydrolyzate derived from a metallic compound having a hydrolyzable reaction site has a small thickness and excellent strength and adhesion to a substrate, can satisfactorily function as a protective layer, has excellent transparency, and can be utilized in various functional films in optical articles, electronic and electric articles, articles made of magnetic materials and the like. For example, the utilization of the functional film in a plasma display offers effects such as excellent visibility, markedly lowered power consumption by virtue of improved regulation of discharge initiation voltage and driving voltage, and realization of a reduction in thickness of the display per se.

The coating composition of the present invention contains an additive that can dissolve or disperse a metallic compound in an organic solvent and, at the same time, can permit a hydrolysis to proceed in a rate-controlling manner, enabling the dissolution or dispersion of even a sparingly soluble metallic compound in an organic solvent to be promoted to prepare a sol solution. Further, in this case, when water is added, the contact of the metallic compound with water is so homogeneous that the hydrolysis can proceed in a highly rate-controlling manner. For a sol solution of a partial hydrolyzate of a metallic compound thus prepared, particles are so homogeneous that the stability of the solution with the elapse of time can be improved. Therefore, a functional film formed by using such a coating composition has high adhesion to a substrate and high strength.

Since the coating composition of the present invention is a sol solution of a partial hydrolyzate, it is superior to a complete hydrolyzate in adhesion to a substrate. In particular, a sol solution of a partial hydrolyzate of a magnesium compound is superior to a coating composition using $Mg(OH)_2$, as a raw material, prepared by complete hydrolysis in adhesion to a substrate. The partial hydrolyzate of a magnesium compound, after the formation of a coating, absorbs water in the air to render the hydrolysis complete, forming a dense $Mg(OH)_2$ film having high adhesion to a substrate. Further, upon heat treatment, this $Mg(OH)_2$ film can be converted to a $MgO$ film having higher density, adhesion, and strength.

The process for producing a functional film according to the present invention is characterized in that the coating composition of the present invention is applied on the surface of a substrate by a coating method to form a functional film, enabling a film to be formed at a lower cost on a large area (such as a display, for a color television, having a large image plane of about 40 in. in terms of diagonal length) as compared with the formation of a thin film by conventional vacuum deposition or other methods.

We claim:

1. A coating composition comprising a partial hydrolyzate of a metallic compound having a hydrolyzable reaction site, said partial hydrolyzate comprising a sol solution prepared from:

(1) a metallic compound having a hydrolyzable reaction site;

(2) an additive that can function to dissolve or disperse said metallic compound in an organic solvent and to permit the hydrolysis of said metallic compound to proceed in a rate-controlling manner;

(3) water in an amount not more than a stoichiometric amount relative to said hydrolyzable reaction site; and (4) an organic solvent, wherein said metallic compound (1) comprises a magnesium alkoxide and said additive (2) comprises diethanolamine.

2. The coating composition of claim 1, wherein said magnesium alkoxide is magnesium dimethoxide.

3. The coating composition of claim 1, further comprising a hydrolysis catalyst.

4. The coating composition of claim 1, further comprising a thickener.

* * * * *